United States Patent [19]
Phillips

[11] 3,772,568
[45] Nov. 13, 1973

[54] LOW VOLTAGE APPLIANCE PROTECTOR
[75] Inventor: Paul D. Phillips, Williamson, W. Va.
[73] Assignee: Gerald L. Chafin, Delbarton, W. Va. a part interest
[22] Filed: Sept. 14, 1972
[21] Appl. No.: 288,911

[52] U.S. Cl. .................... 317/13 A, 317/31, 337/7, 317/50, 317/58
[51] Int. Cl. ........................................... H02h 3/24
[58] Field of Search .................. 317/32, 13 A, 31, 317/DIG. 6, DIG. 5, 155, 9 C, 50, 58, 36 R, 20, 13 R; 307/130; 335/266, 268; 337/7

[56] References Cited
UNITED STATES PATENTS

| 3,474,296 | 10/1969 | Rickey | 317/31 |
| 1,292,585 | 1/1919 | Crichton | 317/36 R |
| 3,001,099 | 9/1961 | Larkey | 317/13 R |
| 3,335,325 | 8/1967 | Elpers | 317/31 |
| 3,419,790 | 12/1968 | Guhn | 317/20 |
| 2,381,254 | 8/1945 | Bonine | 317/31 |
| 3,493,816 | 2/1970 | Monigal | 317/31 |

Primary Examiner—William M. Shoop, Jr.
Assistant Examiner—Harvey Fendelman
Attorney—Burton L. Lilling et al.

[57] ABSTRACT

A method and apparatus for disconnecting a load from a power source when the voltage from the power source falls below a first predetermined level and for reconnecting the load to the power source when the voltage rises above a second predetermined level. The voltage of the power source is constantly sensed and when the voltage falls below a first predetermined level a switch means, which is connected between the power source and the load, is opened, thereby disconnecting the load from the power source. An auxiliary coil is placed in series with the load so that, when a load drawing an initially large current is connected to the power source, the increased current through the auxiliary coil produces a magnetic force to hold the switch means closed even though a voltage below the first predetermined level is sensed. In this manner, false disconnection of the load from the power source is prevented.

13 Claims, 2 Drawing Figures

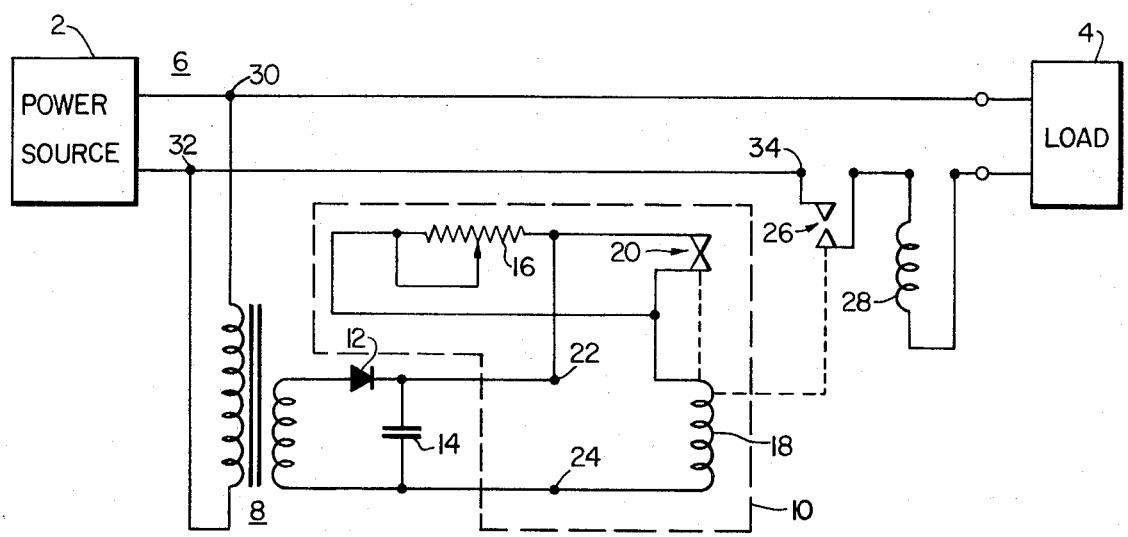
FIG. 1
FIG. 2
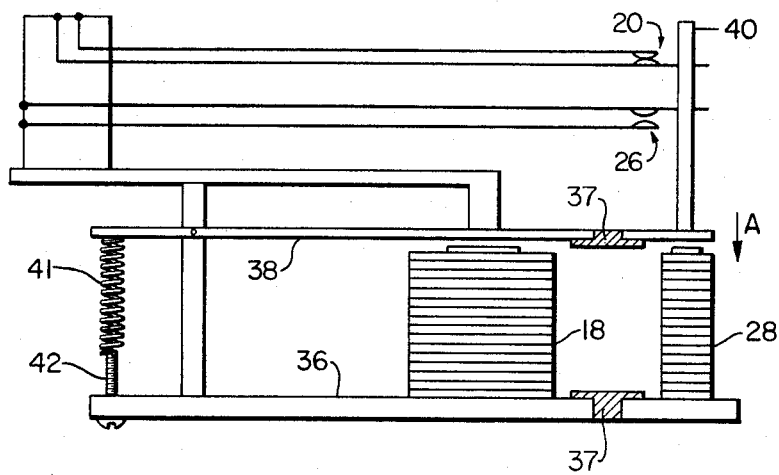

LOW VOLTAGE APPLIANCE PROTECTOR

BACKGROUND OF THE INVENTION

1. Field of the Invention

This invention relates to a method and apparatus for disconnecting and reconnecting a load and a power source and, more particularly, to a method and apparatus for disconnecting a load from a power source when the voltage from the source falls below a first predetermined level and for reconnecting the load to the power source when the voltage rises above a second predetermined level.

2. Description of the Prior Art severe applicance concern

Most electrical appliances are designed to operate at a particular voltage level. When the voltage applied to such an appliance falls below the predetermined level, sever damage to the apliance can result. This problem has caused increasing concer with the increase of electrical power being used. Very often, on hot summer days for instance, electrical power companies are required to cut their voltage in order to continue supplying power to the increased loads due to air conditioning, etc. This decrease in voltage can cause serious damage to many of the electrical devices connected to the line, such as motors or relays.

In the prior art, some devices have been developed for disconnecting the load from a power source when the voltage of the source falls below a predetermined level. However, when a load such as a motor with a starting winding is placed across the load, the increased current drawn by the starting winding causes a low voltage to be sensed. This results in the load being disconnected from the line. Therefore, the device is totally ineffective when used in conjunction with a load which draws an initially large current, such as a motor since the device will constantly disconnect the load from the power source. This situation is particularly prevalent in inadequately wired electrical systems, such as older homes.

SUMMARY OF THE INVENTION

The present invention relates to a method and apparatus for disconnecting a load from a power source when the voltage from the source falls below a first predetermined level. When the voltage rises above a second predetermined level the load is reconnected to the power source. The first and second predetermined levels may be independently set. A sensing means for sensing when the voltage of the source falls below the first predetermined level and rises above the second predetermined level is coupled to the power source. The sensing means includes a resistance which is placed in series with the coil of a relay when the relay is energized. When this series circuit is coupled to the power source and the voltage of the power source is above the second predetermined level, it is sufficient to overcome the spring tension of the bias spring of the armature of the relay and the relay coil energizes the relay. When the voltage of the source falls below the first predetermined level, the voltage across the series circuit experiences a corresponding drop and this voltage is insufficient to maintain a current through the relay coil sufficient to energize the relay. After the relay has been de-energized and the voltage rises above a second predetermined level, the relay is reenergized thereby connecting the load to the power source.

A set of normally open relay contracts associated with the relay coil is connected between the power source and the load. When the relay coil is energized, because the voltage of the power source rises above the second predetermined level, the normally open contacts are closed and a circuit is completed between the power source and the load. If, however, the voltage of the source falls below the first predetermined level, the current through the relay coil is insufficient to maintain its energization and the normally open relay contacts return to their open state, thereby disconnecting the load from the power source.

A auxiliary coil, positioned to hold the armature of the relay in its energized position, is connected in series with the load to prevent the load from being disconnected from the power source in response to increased current drawn by loads which require more current for their initial operation. Loads of this type include motors with starting windings for example. The auxiliary coil is a self excited, self compensated device. Thus, the greater the current through the auxiliary coil, due to the increased current drawn by the load, the greater the magnetic field it creates and consequently the greater the force it exerts on the armature of the relay in the sensing circuit.

The present invention also includes a novel relay device in which the relay and auxiliary coil are both mounted on the same frame but magnetically insulated from each other. The relay is energized by direct current while the auxiliary coil is responsive to alternating current.

It is therefore an object of this invention to disconnect a load from a power source when the voltage from the source falls below a first predetermined level and to reconnect the load to the power source when the voltage rises above a second predetermined level.

It is a further object of this invention to sense the voltage of the power source by coupling a series circuit of a resistor and a relay coil across the power source, between the power source and the load, such that when the voltage of the power source falls below a first predetermined level the corresponding voltage drop is seen across the series circuit. The corresponding decrease in the current through the series circuit is such that the current can no longer maintain the energization of the relay coil.

It is still a further object of this invention to connect an auxiliary coil in series with the load, whereby increased current initially drawn by the load, such as by the starting winding of a motor, does not cause the disconnection of the load from the power source.

It is also the object of this invention to provide means for independently setting the first and second predetermined voltage levels.

It is a still further object of this invention to provide a relay device having a d.c. relay and an a.c. coil mounted on the same frame and magnetically insulated from each other, wherein the a.c. coil is positioned to exert a force on the armature of the d.c. relay.

BRIEF DESCRIPTION OF THE DRAWINGS

FIG. 1 is a circuit diagram of the preferred embodiment of the present invention.

FIG. 2 is a plan view of the relay device used in the preferred embodiment.

DESCRIPTION OF THE PREFERRED EMBODIMENT

Referring to FIG. 1, power source 2 is used to supply power to load 4 through line 6. The primary of low voltage transformer 8 is connected across line 6 and diode 12 and filter capacitor 14 are connected to the secondary of transformer 8. This arrangement is used to supply a d.c. voltage, proportioned to the source voltage, to sensing means 10. Connected across capacitor 14 is a series circuit including variable resistor 16 and relay coil 18. A set of normally closed relay contacts 20 are associated with relay coil 18. Contacts 20 are connected across resistor 16, thereby shunting the resistor when in their normally closed position. When the voltage of power source 2 goes above a second predetermined level the voltage is coupled to the series circuit via transformer 8. Current flows from terminal 22 through relay contacts 20, relay coil 18 to terminal 24. This current cuases the energization of the relay which opens normally closed contacts 20. A series circuit is then formed from terminal 22 through resistor 16, through relay coil 18, and back to terminal 24. The second predetermined voltage is set by setting the tension of spring on the armature of the relay.

Once having risen above the second predetermined level, when the voltage from power source 2 falls below a first predetermined level which is lower than the second predetermined level, a correspondingly low voltage appears across terminals 22 and 24. Therefore, the voltage across the series circuit of resistor 16 and relay coil 18 drops. This causes a corresponding decrease in the current through the series circuit. The decrease in current is such that the current is no longer sufficient to maintain the energization of the relay, and coil 18 can no longer hold its associated contacts in their respective non-normal states. By adjusting variable resistor 16, it will be seen that the first predetermined voltage, which causes the insufficient current through relay coil 18, may be varied.

When the voltage has fallen below the first predetermined level and the relay has become deenergized, the voltage must rise above the second predetermined level, which is 10-15 percent higher than the first predetermined level, to reenergize the relay. The second predetermined level may be varied by adjusting the spring tension of the armature of the relay. The second predetermined level is therefore independent of the first predetermined level and may be varied independently.

Normally open relay contacts 26 are connected between power source 2 and load 4. When the voltage of power source 2 is above the first predetermined level and relay coil 18 is energized, normally open contacts 26 are closed to thereby complete the circuit between the power source and the load. However, when the voltage of the power source falls below the first predetermined level and the relay becomes deenergized, contacts 26 return to their normally open state and the load is disconnected from the power source.

An auxiliary coil 28 is connected in series with load 4 to prevent the sensing means 10 from disconnecting the load from the source in response to the increased current drawn by the load when it is initially connected to the source. The auxiliary coil 28 is positioned such that, when it is energized by the increased current, it exerts a force, on the armature of relay coil 18, which holds the armature in its non-normal or energized position regardless of whether relay coil 18 is energized. If the auxiliary coil 28 were not included in the circuit then the increased current could cause the sensing means 10 to sense a low voltage condition and disconnect the load from the source. Since the source is actually above the second predetermined level and the load would be reconnected to the source. This could cause increased current resulting in the disconnection. As can be seen, the sensing means could keep connecting and disconnecting the load and source until the relay finally failed. The auxiliary coil 28 prevents this from happening while having an insignificant effect on the disconnection of the load from the source by sensing means 10 in response to a low voltage condition at the source. The coil 28 is self compensating in that the greater the increased current the greater the magnetic field of the coil.

FIG. 2 represents the relay device used in the circuit shown in FIG. 1. The numbers of the elements in FIG. 2 correspond to those in FIG. 1. Coil 18 and auxiliary coil 28 are mounted on base member 36 and are magnetically insulated from each other by inserts 37. Armature 38 moves in the direction shown by arrow A when coil 18 is energized by a direct current. The movement of armature 38 moves member 40 down thus opening contacts 20 and closing contacts 26. Upon the closing of contacts 26 the line current, which is an alternating current, passes through auxiliary coil 28. When the current through auxiliary coil 28 is large due to the initial connection of the load to the source, the magnetic field created in the auxiliary coil 28 exerts a force on armature 38 sufficient to hold the armature down regardless of whether relay coil 18 is energized. The magnetic field created by current through auxiliary coil 28 does not affect coil 18 because the coils are magnetically insulated.

The tension of spring 41 may be adjusted by adjusting screw 42. The magnetic force on armature 38 required to move it downward must be sufficient to overcome the tension of spring 41. Therefore the voltage required to energize the relay may be varied merely by adjusting screw 42. Screw 42 therefore controls, and may be used to vary the second predetermined level at which the relay is reenergized.

The device may be adapted for use in 110 or 220 volt systems by the selecting of transformer 8.

I claim:

1. A device for disconnecting a load from a power source when the voltage from said source falls below a first predetermined level, and for reconnecting said load to said power source when the voltage rises above a second predetermined lever, said device comprising:
   a. sensing means coupled to said power source for sensing when the voltage of said power source falls below the first predetermined level and when the voltage rises above the second predetermined level;
   b. switch means connected between said power source and said load, said switch means being responsive to said sensing means for disconnecting said power source from said load when the voltage of said power source falls below the first predetermined level and reconnecting said power source to said load when the voltage of said power source rises above the second predetermined level; and c. means connected to said load for preventing said switch means from being responsive to said sensing means when said sensing means detects a voltage below the first predetermined level in response to initial increased current drawn by said load when said load is connected to said power source.

2. The device as set forth in claim 1, wherein said sensing means comprises:
   a. a series circuit of a resistance means and the coil of a relay, said series circuit being coupled to said power source; and
   b. a first set of normally closed relay contacts, associated with said relay, connected across said resistance means and thereby shunting said resistance means, said first set of relay contacts being opened by energization of said relay;
   c. wherein current from said power source flows through said first set of contacts and said relay coil to energize said relay, whereby said first set of contacts is opened and current from said power source then flows through said resistance means and said relay coil, and wherein when the voltage from said source falls below the first predetermined level, the current through said relay coil is not sufficient to maintain the energization of said relay.

3. The device as set forth in claim 2 wherein said resistance means is a variable resistor and wherein variation of said resistor causes a corresponding change in the first predetermined level.

4. The device as set forth in claim 2 wherein said switch means is a second set of normally open relay contacts associated with said relay, said second set of normally open relay contacts being closed in response to the energization of said relay, whereby the closing of said second set of relay contacts completes a circuit between said power source and said load.

5. The device as set forth in claim 4 further including adjusting means for adjusting the second predetermined level independently at said first predetermined level.

6. The device as set forth in claim 5 wherein said adjusting means comprises means for varying the spring tension of the armature of said relay.

7. The device as set forth in claim 1 wherein said preventing means comprises auxiliary coil means in series with said load, said auxiliary coil means being positioned to exert a magnetic force on the armature of said relay in response to the initial increased current drawn by said load when said load is connected to said source, whereby said armature is held by said auxiliary coil means, in its non-normal position even when said sensing means detect a voltage below the first predetermined level due to the initial increased current.

8. The device as set forth in claim 2 wherein said preventing means comprises auxiliary coil means in series with said load, said auxiliary coil means being positioned to exert a magnetic force on the armature of said relay in response to the initial increased current drawn by said load when said load is connected to said source, whereby said armature is held by said auxiliary coil means, in its non-normal position even when said sensing means detects a voltage below the first predetermined level due to the initial increased current.

9. The device as set forth in claim 8 wherein said relay coil and said auxiliary coil means are mounted on a single magnetically insulated frame member such that said relay coil means and said auxiliary coil means are magnetically insulated from each other.

10. The device as set forth in claim 9 wherein said relay coil is energized by direct current and said auxiliary coil is energized by alternating current.

11. A device for disconnecting a load from a power source when the voltage from said source falls below a first predetermined level, said device comprising:
   a. a series circuit including the coil of a relay and a resistance means being coupled to said power source;
   b. a normally closed set of relay contacts associated with said relay and connected across said resistance means to shunt said resistance means, said normally closed set of relay contacts being opened in response to the energization of said relay; and
   c. a normally open set of relay contacts associated with said relay and connected between said power source and said load, said normally open set of relay contacts being closed in response to the energization of said relay;
   d. wherein the voltage of said source falls below said first predetermined level, the current in said series circuit is insufficient to maintain the energization of said relay and said normally open relay contacts return to their normally open state thereby disconnecting said load from said power source.

12. A method of disconnecting a load from a power source when the voltage from said power source falls below a first predetermined level and reconnecting said load to said power when the voltage rises above a second predetermined level, said method comprising the steps of:
   a. sensing the voltage of said source to determine when said voltage falls below said first predetermined level;
   b. disconnecting said load from said source when said voltage falls below said first predetermined level;
   c. preventing voltage drops, caused by the initial increased current drawn by said load when said load is connected to said power source from causing the disconnection of said source from said load;
   d. sensing when the voltage of said source rises above said second predetermined level; and
   e. reconnecting said load to said source when the voltage of said source rises above the second predetermined level.

13. The method as set forth in claim 12 wherein the voltage is sensed by coupling the voltage of said source across a series circuit comprising a resistor and a coil of a relay such that when the voltage falls below the first predetermined level the current in said series circuit is not sufficient to maintain the energization of said relay, whereby the deenergization of said relay causes the disconnection of said load from said source, and when the voltage rises above the second predetermined level the relay is reenergized.

* * * * *